May 1, 1923.

C. W. PARKER

FRICTION DISK

Filed Aug. 2, 1920

1,453,599

Inventor
Clark W. Parker.
By Edward N. Pagelsen
Attorney

Patented May 1, 1923.

1,453,599

UNITED STATES PATENT OFFICE.

CLARK W. PARKER, OF NEW YORK, N. Y.

FRICTION DISK.

Application filed August 2, 1920. Serial No. 400,700.

*To all whom it may concern:*

Be it known that I, CLARK W. PARKER, a citizen of the United States, and residing at New York, in the county of New York and State of New York, have invented a new and Improved Friction Disk, of which the following is a specification.

This invention relates to the construction of brake disks, thrust collars and washers, and other ring-like members which are subject to considerable pressures, and its object is to provide a device of this character with parallel faces formed of two similar circular plates spaced apart to permit free flow of air, water, or other cooling mediums and lubricant, which plates engage at a sufficiently large number of points to prevent either plate from buckling, and which may be permanently united.

In my prior Patent No. 1,315,236, dated September 9, 1919, I have shown a brake disk consisting of two flat plates secured to a radially corrugated intermediate member, the several parts being formed with teeth or projections along their outer or inner edges. In the present case the intermediate member is omitted and the two bearing plates are each formed with inwardly extending projections of predetermined height so that when two plates formed of metal of predetermined gauge are brought together with the projections on the inside, the resulting disk will have a predetermined total thickness and predetermined spacing between the plates to constitute the passage for the cooling medium and lubricant.

Figure 1:
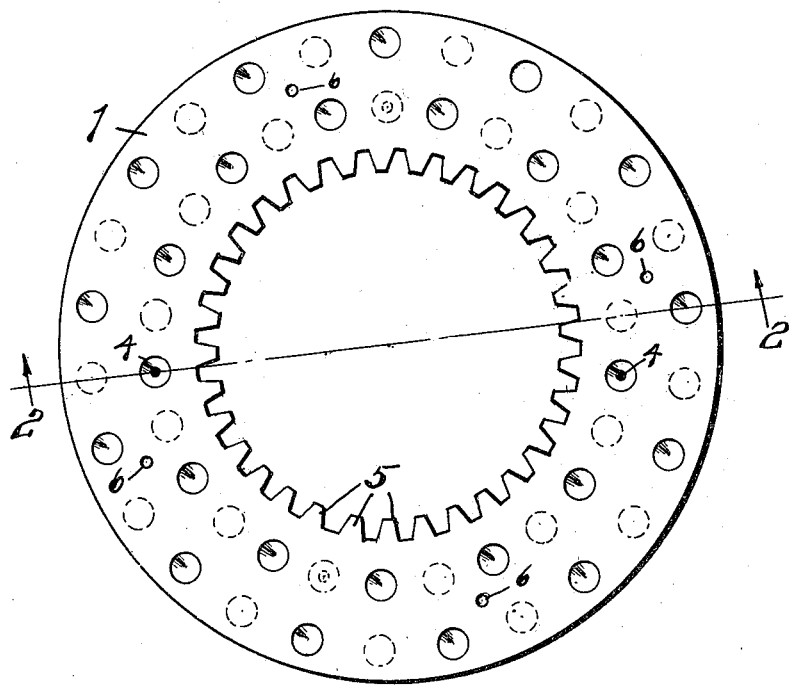
Figure 2:
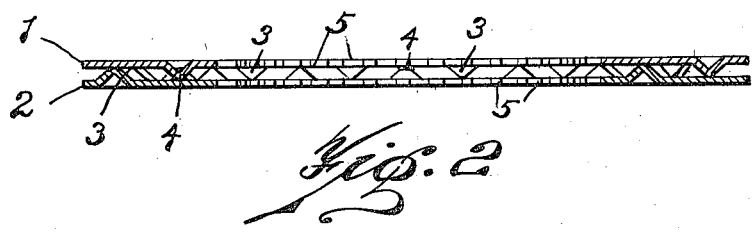

In the accompanying drawing, Fig. 1 is a plan of this improved brake disk and Fig. 2 is a section on the line 2—2 of Fig. 1.

Similar reference characters refer to like parts throughout the several views.

The plates 1 and 2 shown in the drawing are formed with inwardly extending projections 3, preferably conical and the same dies are preferably used for forming both plates. The metal will usually be of predetermined thickness and the cones 3 of predetermined height so that when the two plates are assembled and preferably united by electric spot welding the points 4 of a plurality of cones on each plate to the other plate, a disk with the desired passage for a cooling medium is obtained. The outer surfaces of the plates may be finished before or after assembling.

In the present case, the inner edges of the annular plates are formed with teeth 5 to connect the disk to a fluted shaft, but these may be omitted or any other method of engaging the disk with a rotatable or stationary member may be employed. The depressions in the outer sides of the disk, which are formed when the projections 3 are struck up, serve as lubricant receptacles and are of great value. When these disks are used as shown in my prior patent mentioned above, lubricant will flow freely between the plates of each disk and I have therefore provided small passages 6 through which the lubricant may pass to the outer faces of the disk.

The number of the projections 3 and their shape and the proportions and details of the plates may all be varied by those skilled in the art without departing from the spirit of my invention as set forth in the following claims.

I claim:—

1. A new article of manufacture comprising two annular plates, one having a series of projections struck up from its body and extending toward and contacting with the other plate, the contacting ends of a plurality of said projections being united to the other plate, one edge of one of said plates being formed with a plurality of radial extensions.

2. A new article of manufacture comprising two parallel circular plates, each having a series of integral struck up projections extending toward and contacting with the other plate.

3. A new article of manufacture comprising two parallel annular plates, each having a series of integral projections struck up from its body and extending toward and contacting with the other plate, the contacting ends of a plurality of said projections being welded to the other plate, one edge of one of said plates being formed with a plurality of radial extensions.

4. A friction disk comprising two parallel annular plates each having one edge serrated, and each having a series of integral conical projections extending toward the other plate and a series of oil passages, the contacting ends of a plurality of said projections on each plate being welded to the other plate.

CLARK W. PARKER.